UNITED STATES PATENT OFFICE.

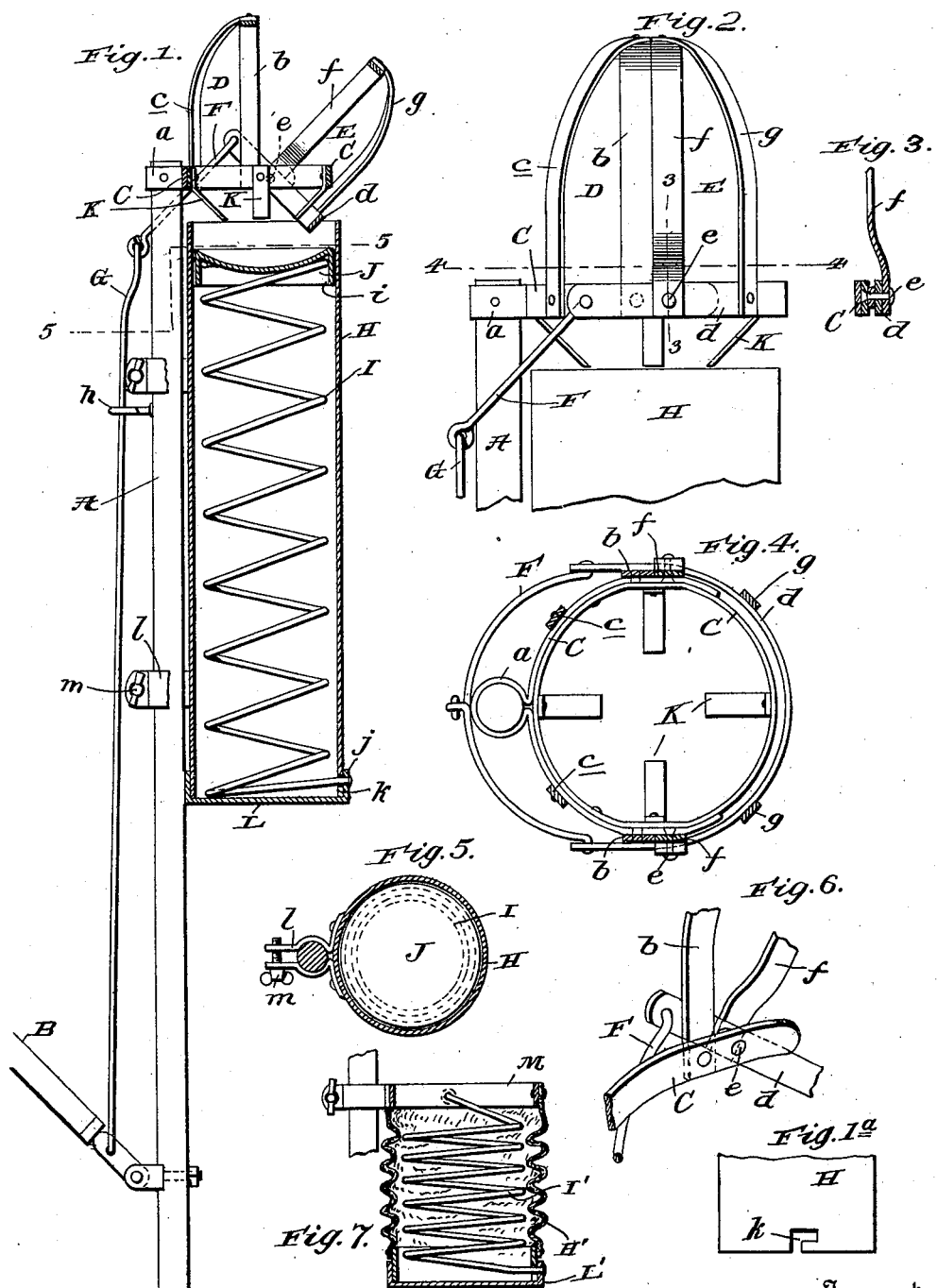

JOSEPH A. DANSEREAU, OF WOONSOCKET, RHODE ISLAND.

FRUIT-PICKER.

SPECIFICATION forming part of Letters Patent No. 674,235, dated May 14, 1901.

Application filed February 21, 1901. Serial No. 48,291. (No model.)

*To all whom it may concern:*

Be it known that I, JOSEPH A. DANSEREAU, a subject of the King of Great Britain, residing at Woonsocket, in the county of Providence and State of Rhode Island, have invented new and useful Improvements in Fruit-Pickers, of which the following is a specification.

My invention relates to improvements in fruit-pickers; and it consists in the peculiar construction, certain novel combinations, and the adaptation of parts hereinafter described, and particularly pointed out in the claims appended.

In the accompanying drawings, Figure 1 is a view, partly in side elevation and partly in vertical section, of my improved fruit-picker. Fig. 1ª is a detail elevation illustrating the bayonet-slot in the lower end of the receiver of the picker. Fig. 2 is an enlarged elevation of the upper portion of the same. Fig. 3 is a detail vertical section taken in the plane indicated by the broken line 3 3 of Fig. 2. Fig. 4 is a horizontal section taken in the plane indicated by the broken line 4 4 of Fig. 2. Fig. 5 is a section taken on the broken line 5 5 of Fig. 1. Fig. 6 is a detail perspective view illustrating the manner in which the swinging fruit-detaching jaw is connected to the jaw-support. Fig. 7 is a detail section illustrating a modified fruit-receiver.

Referring by letter to the said drawings, and more particularly to Figs. 1 to 6 thereof, A is the pole of my improved fruit-picker. B is a handle connected in a hinged manner to the pole at a point adjacent to the lower end thereof, and C is the support of the fruit-detaching jaws. The said support C, which is preferably made of sheet metal, is circular in form and provided, as best shown in Fig. 4, with an eye $a$, which receives and is fixedly connected to the upper end of the pole A.

D is the stationary fruit-detaching jaw, and E is the movable detaching-jaw. These jaws in conjunction form a cage to receive the fruit after the same is detached, and they may be of any suitable construction. I prefer, however, to form them of sheet-metal straps and have the stationary jaw D comprise a bow $b$, disposed above and connected at its ends to the support C, and curvilinear braces $c$, connected at their lower ends to the support and at their upper ends to the bow. The movable jaw E preferably comprises a U-shaped base $d$, which straddles the support C and is pivotally connected thereto at opposite points, as indicated by $e$, a bow $f$, which is connected at its ends to the U-shaped base, and curvilinear braces or bars $g$, which are connected at their lower ends to the base $d$ and at their upper ends to the bow $f$, as shown. The end portions of the base $d$ of jaw E are connected to the ends of a bail F, which straddles the pole and the jaw-support C, and the said bail is connected in turn to a rod G, which extends downwardly through one or more guides $h$ on the pole and is connected at its lower end to the handle B. By reason of this construction it will be observed that when the handle B is swung upwardly the jaw E will assume the position shown in Fig. 1 to permit of the interposition of a piece of fruit between the jaws, while when said handle is moved downwardly the jaw E will be carried against the jaw D and the piece of fruit will be detached thereby.

H is a fruit-receiver, preferably cylindrical in form, which is connected to the pole A and disposed below and in alinement with the jaw-support C. This receiver contains a helical spring I and a vertically-movable platform J, arranged on and supported by the spring, the said platform being preferably dished to enable it to better hold a piece or pieces of fruit and prevent the same being scraped against the wall of the cylinder incident to the downward movement of the platform and being preferably provided with a marginal flange $i$, which serves to receive and hold it on the upper whirl of the spring, as shown in Fig. 1. The spring-supported platform is calculated to give downwardly to and cushion the fall of fruit in the receiver, and thereby effectually prevent bruising of or other injury to the fruit, which is obviously an important advantage.

K K are spring-strips which are connected to the jaw-support C and extend downwardly and inwardly therefrom to a point slightly above the plane of the upper end of the receiver. These spring-strips are designed to give outwardly, and thereby permit a piece of fruit to drop between them, and they are also calculated to immediately reassume the position illustrated, and thereby effectually prevent the piece of fruit rebounding from the platform K into the cage formed by the jaws D E.

I prefer in practice to provide the receiver H with a removable bottom L, having a flange $j$, and I also prefer to connect the lower end of the spring I to said flange and normally arrange said end of the spring in a bayonet-slot $k$ in the lower end of the receiver, whereby it is enabled to securely hold the bottom against casual removal from the receiver. This construction is advantageous, since by simply turning and moving the bottom L downwardly the said bottom, together with the spring I and platform J, may be readily removed from the receiver to permit of the discharge of the collected fruit through the lower end thereof.

The receiver H may be connected to the pole A in any suitable manner, although I prefer to connect it by means which will permit of it being swung around on the pole and out of alinement with the support when desired, this with a view of permitting the discharge of picked fruit from the upper end of the receiver when it is preferable to effect the discharge in that manner. The means which I have shown for connecting the receiver to and normally fixing it on the pole comprises clips $l$, connected to the receiver adjacent to the upper and lower ends thereof and arranged to straddle the pole and provided with thumb-screws $m$, whereby they may be tightly bound on the pole to hold the receiver against movement with respect thereto. When the said thumb-screws are loosened, the receiver may obviously be swung around the pole to carry it out of alinement with the support C and jaws D E for the purpose before described.

When the bottom L of the receiver is removable therefrom, together with the spring I and platform J, it is obvious that the receiver may be fixedly connected to the pole, and also when the receiver is connected to the pole in such manner as to permit of it being swung around the same when desired the bottom of the receiver may be permanently connected thereto without departing from the scope of my invention.

In the practical operation of my invention the pole A is manipulated and the jaw E actuated in the usual manner. The piece of fruit picked by the jaws drops between the spring-strips K to the platform J, which being spring-supported cushions, and thereby precludes bruising of the fruit. This operation is repeated until the receiver H is filled, when it is discharged of its contents either by removing the bottom L, spring I, and platform J or by loosening the thumb-screws and swinging the receiver around the pole into a position out of alinement with the jaw-support and jaws, as desired.

In Fig. 7 of the drawings I have illustrated a modified receiver H', formed of canvas or other flexible material. This receiver is provided with a platform L', which serves the additional function of a bottom, and an annular upper end portion M, the latter alone being connected to the pole A. In the said receiver H' is arranged a coiled spring I', which is connected at its upper end to the portion M and at its lower end to the platform L' and is calculated to yieldingly support the latter. The spring I' differs from the spring I (shown in Fig. 1) in that it is normally contracted. By virtue of this and the flexible material of which the receiver is formed it will be observed that as the receiver is filled with fruit it will be elongated or extended downwardly, also that the spring-supported platform L' will cushion the fall of the fruit and preclude bruising of the same. It will also be observed that in this construction the fruit falls through the whirls of the spring to the platform L'.

The connection between the flexible receiver and the pole is similar to that shown in Fig. 1, this with a view of permitting the receiver to be swung around the pole and out of alinement with the fruit-detaching means when it is desired to discharge the said receiver of its contents.

Having described my invention, what I claim, and desire to secure by Letters Patent, is—

1. A fruit-picker comprising a pole, fruit-detaching means thereon, a receiver normally disposed below the fruit-detaching means and having a spring-supported platform, and a clip on the receiver straddling the pole and provided with adjustable means for binding it thereon, said clip being adapted when loosened to permit of the receiver being swung around the pole and out of alinement with the fruit-detaching means.

2. A fruit-picker, comprising a pole, an open support connected to and disposed at right angles to the pole, the fixed jaw connected to and rising from the support, the movable jaw pivotally connected to the support, a handle connected to the pole, a connection between said handle and the movable jaw, resilient strips connected to and extending downwardly and inwardly from the jaw-support, and a receiver connected to the pole and arranged below the jaw-support.

3. A fruit-picker, comprising a pole, an open support connected to and disposed at right angles to the pole, the fixed jaw connected to and rising from the support, the movable jaw pivotally connected to the support, a handle connected to the pole, a connection between said handle and the movable jaw, resilient strips connected to and extending downwardly and inwardly from the jaw-support, and a receiver connected to the pole and arranged below the jaw-support, and having a spring-supported platform.

4. A fruit-picker comprising a pole, fruit-detaching means thereon, a cylindrical receiver connected to the pole below the detaching means and having a bayonet-slot in its lower end, a removable bottom, a spring arranged in the receiver and connected to the removable bottom and adapted to rest in the bayonet-slot, and a platform arranged on and supported by said spring.

In testimony whereof I have hereunto set my hand in presence of two subscribing witnesses.

JOSEPH A. DANSEREAU.

Witnesses:
EDGAR L. SPAULDING,
GEO. W. SPAULDING.